United States Patent [19]

Hefner, Jr.

[11] Patent Number: 4,777,208

[45] Date of Patent: * Oct. 11, 1988

[54] POLYMER MODIFIED UNSATURATED POLYESTER FOR POLYESTERAMIDE RESIN POLYMER CONCRETE

[75] Inventor: Robert E. Hefner, Jr., Lake Jackson, Tex.

[73] Assignee: The Dow Chemical Company, Midland, Mich.

[*] Notice: The portion of the term of this patent subsequent to Sep. 9, 2003 has been disclaimed.

[21] Appl. No.: 822,991

[22] Filed: Jan. 27, 1986

[51] Int. Cl.$^4$ .................... C08L 67/06; C08L 77/12
[52] U.S. Cl. .................... 524/855; 524/513; 524/878; 523/512; 523/521; 523/526; 523/527
[58] Field of Search .............. 524/513, 878, 855; 523/526, 512, 521, 527

[56] References Cited

U.S. PATENT DOCUMENTS

| | | | |
|---|---|---|---|
| 4,228,251 | 10/1980 | Maekawa | 525/168 |
| 4,346,050 | 8/1982 | Trent | 523/521 |
| 4,371,639 | 2/1983 | Muszynski | 523/512 |
| 4,409,371 | 10/1983 | Hefner | 525/418 |
| 4,410,686 | 10/1983 | Hefner | 528/288 |
| 4,611,015 | 9/1986 | Hefner | 523/408 |

OTHER PUBLICATIONS

*Handbook of Composites* Lubin, G., p. 19, Van Nostrand Reinhold Co. 1982.

*Primary Examiner*—Patricia Short
*Attorney, Agent, or Firm*—B. G. Colley

[57] ABSTRACT

Polymer modified unsaturated polyester or polyesteramide resin polymer concrete is prepared by mixing an aggregate mixture such as gravel, sand, and silica flour with an unsaturated polyester or polyesteramide resin that is modified with hydrocarbon polymers produced by the in situ polymerization of olefinically unsaturated hydrocarbon mixtures.

12 Claims, No Drawings

POLYMER MODIFIED UNSATURATED POLYESTER FOR POLYESTERAMIDE RESIN POLYMER CONCRETE

BACKGROUND OF THE INVENTION

The modification of unsaturated polyesters with the esterifiable reactive hydrocarbon dicyclopentadiene is a well established technology. Typical of this art are U.S. Pat Nos. 4,370,447; 4,100,120; 4,148,765; 4,224,430; 4,233,432 and 4,246,367. Dicyclopentadiene is sold commercially as a product of about 97 or greater percent purity. It is also sold as $C_{10}$ hydrocarbon concentrate prepared by dimerizing a crude $C_{10}$ stream from the cracking of hydrocarbons as taught in U.S. Pat. No. 3,557,239. A preferred dicyclopentadiene source for use in modification of unsaturated polyesters is one that is low in peroxides and hydroperoxides and in light hydrocarbons and residual cyclopentadiene.

Dicyclopentadiene concentrates have as the main reactive component about 70 to 90 percent by weight of dicyclopentadiene and about 5 to about 30 percent by weight of mixed Diels-Alder dimers of diolefins such as butadiene, cis- and trans-piperylene, isoprene, cyclopentadiene and methyl cyclopentadiene. The remainder of these concentrates generally comprise residual $C_5$ hydrocarbons and oligomers of the above diolefins. Examples of some of the dimers which have been identified in these concentrates are the Diels-Alder adducts of two moles of isoprene (isoprene dimers), the adduct of cyclopentadiene and isoprene, the adduct of cyclopentadiene and piperylene, and the like. It is notable that the prior art teaches both the use of the $C_{10}$ concentrate or the relatively pure dicyclopentadiene as sources of esterifiable hydrocarbon reactives for the modification of unsaturated polyesters.

More recently, modification of unsaturated polyesteramides with the aforementioned dicyclopentadiene or $C_{10}$ concentrates has been described. Typical of this art are U.S. Pat. Nos. 4,410,686; 4,409,371 and 4,471,101.

Polymer concretes are well known from U.S. Pat. Nos. 4,346,050; 4,371,639; 4,375,489 and the references cited therein. The use of polymers in concrete is further reviewed in "Chemical, Polymer and Fiber Additives for Low Maintenance Highways" by Hoff et al. Noyes Data Corp 1979 pages 467–511.

A new class of unsaturated thermosettable resins, the polymer modified unsaturated polyester and polyesteramide resins are described in co-pending application Ser. No. 822,990 filed Jan. 27, 1986. It has now been found that the use of the novel polymer modified unsaturated polyester and polyesteramide resins to prepare polymer concretes provides unexpected increases in both wet and dry compressive bond strength and in tensile strength over polymer concretes prepared using known prior art unsaturated thermosettable resins.

SUMMARY OF THE INVENTION

The present invention is a thermosettable polymer concrete composition comprising
(A) about 2 to about 20, preferably about 8 to about 15 percent by weight (pbw) of a polymer modified unsaturated polyester or polyesteramide resin, and
(B) about 98 to about 80, preferably about 92 to about 85 pbw of an aggregate.

A further aspect of the present invention concerns cured polymer concrete compositions obtained by curing of the polymer modified unsaturated polyester or polyesteramide resin and aggregate composition with known catalyst systems.

DETAILED DESCRIPTION OF THE INVENTION

The polymer modified unsaturated polyesters or polyesteramides used in the present invention are prepared via polymerization of
(A) one or more alpha, beta ethylenically unsaturated polycarboxylic acids, anhydrides, or mixtures thereof with or without one or more saturated or aromatic polycarboxylic acids or anhydrides thereof
(B) an effective amount of water,
(C) one or more polyols or a mixture of one or more polyols and polyamines and
(D) a hydrocarbon mixture comprising
 (1) esterifiable hydrocarbons,
 (2) ethylenically unsaturated aromatic hydrocarbons with or without polymerized derivatives thereof and
 (3) non-reactive hydrocarbons.

Typical ethylenically unsaturated polycarboxylic acids that are useful herein include maleic acid, fumaric acid, itaconic acid, maleic anhydride, mixtures thereof and the like. The remainder, if any, of the polycarboxylic acids are usually either saturated normal aliphatics such as adipic acid, succinic acid and the like or aromatics such as phthalic acid, phthalic anhydride, isopthalic acid and the like. The term polycarboxylic acid, as used herein, is intended to embrace the anhydride as well.

The ethylenically unsaturated polycarboxylic acid and/or anhydride provides the unsaturation needed for curing the resin. Therefore, the actual ratio of unsaturated acid to saturated or aromatic acid will be dictated by the degree of crosslinking desired in the cured product. That degree of crosslinking may be predetermined by simple preliminary experiments as is standard in the polyester art. The polycarboxylic acid is preferably maleic acid, fumaric acid, maleic anhydride or mixtures of those compounds.

The polyols that are useful herein are those which are reactive with polycarboxylic acids and/or anhydrides and may include, for example, the diols, such as ethylene glycol, propylene glycol, diethylene glycol, dipropylene glycol, butanediol, hexanediol, dicyclopentadiene dimethanol, triethylene glycol, polyethylene glycol and the polyols, such as polypropoxylated glycerin, polyethoxylated glycerin, pentaerythritol, glycerine, sorbitol; and trimethylolpropane. Mixtures of two or more of such polyols can be used. The polyol is preferably ethylene glycol, propylene glycol, a glycerin polypropoxylate or mixtures of those polyols.

The esterifable hydrocarbon reactives that are useful herein include, for example, dicyclopentadiene, $C_{10}$ hydrocarbon concentrates, polycyclopentadiene (dicyclopentadiene oligomers), norbornene, mixtures thereof and the like. Especially preferred are dicyclopentadiene and $C_{10}$ hydrocarbon concentrates.

An effective amount of water is that quantity which provides about 1.1 to about 2.0 moles per mole of unsaturated polycarboxylic acid or anhydride. A preferred range is about 1.5 to 2.0 moles of water per mole of unsaturated acid or anhydride.

The ethylenically unsaturated aromatic hydrocarbons that are useful herein include, for example, styrene, vinyl toluenes, allyl benzene, dimethyl styrenes, mixtures thereof and the like. Especially preferred are styrene and the vinyl toluenes.

The non-reactive hydrocarbons that are optionally present in the mixture containing esterifiable hydrocarbon reactives and ethylenically unsaturated aromatic hydrocarbons are those which are not reactive with the other components used to prepare the unsaturated polyesters and polyesteramides of the present invention. Included are aliphatic, cycloaliphatic, aromatic, alkylaromatic, polyalkylaromatic hydrocarbons and the like. Typical examples of said non-reactive hydrocarbons are toluene, xylene, cyclohexane and the like.

Typical polyamines that are useful herein to make the polyesteramide resins are those that are reactive with polycarboxylic acids and/or anhydrides and may include, for example, the diamines, such as ethylene diamine, propylene diamine, hexane -1,6-diamine, piperazine, 2-2'-bis(4-aminocyclohexyl) propane, bis-(aminomethyl) norbornane, toluene diamine and the polyamines, such as aminoethylpiperazine and diethylenetriamine. Mixtures of two or more of such polyamines can be used. The polyamine is preferably piperazine.

The mixture containing esterifiable hydrocarbon reactives, ethylenically unsaturated aromatic hydrocarbons and, optionally, non-reactive hydrocarbons may be obtained by direct blending of the required components or, more preferably, as a resin oil distillation cut from hydrocarbon processing. For purposes of the present invention, said resin oils consist of three distinct types of components: esterifiable hydrocarbon reactives including, for example, dicyclopentadiene, methyl dicyclopentadiene, cyclopentadiene codimers, diolefin dimers and the like; ethylenically unsaturated aromatic hydrocarbons including, for example, styrene and vinyl toluenes; and non-reactive hydrocarbons including aliphatic, cycloaliphatic, aromatic, alkylaromatic, polyalkyaromatic hydrocarbons and the like.

The composition of the resin oil can vary within wide limits depending on the hydrocarbon feedstock being processed, the type of process, the distillation conditions and many other known variables. The amount of the esterifiable hydrocarbon reactives component useful in the reactions of the present invention can vary from about 25 percent by weight (pbw) to about 95 pbw. The amount of the ethylenically unsaturated aromatic hydrocarbon component can vary from about 5 pbw to about 50 pbw. The remainder is the non-reactive hydrocarbon component. A typical resin oil composition is given in U.S. Pat. No. 4,247,335 (Col. 2).

The mixture containing esterifiable hydrocarbon reactives, ethylenically unsaturated aromatic hydrocarbons and, optionally, non-reactive hydrocarbons may be reacted with a free radical forming catalyst at a time and temperature suitable to induce polymerization of all or a part of the ethylenically unsaturated aromatic hydrocarbons contained therein. Said total or partial polymerization of the ethylenically unsaturated aromatic hydrocarbons is thus completed prior to reaction of the esterifiable hydrocarbon reactives in an unsaturated polyester or polyesteramide forming reaction. Suitable free radical forming catalysts include the organic peroxides and hydroperoxides as well as the azo and diazo compounds. Representative of said free radical forming catalysts are benzoyl peroxide, t-butylhydroperoxide, cumene hydroperoxide, azobisisobutyronitrile, mixtures thereof and the like. An inert atmosphere, such as is provided by nitrogen or argon gas, is typically employed in the total or partial polymerization reaction.

The ethylenically unsaturated aromatic hydrocarbons present in mixtures of esterifiable hydrocarbon reactives, ethylenically unsaturated aromatic hydrocarbons, and non-reactive hydrocarbons may be polymerized to the extent of 5 to 100 percent and preferably to the extent of 10 to 50 percent.

The preferred process of the present invention is the "prehydrolysis method" wherein a molten polycarboxylic anhydride is essentially totally hydrolyzed with stoichiometric or greater equivalency of water and reacted with the mixture containing esterifiable hydrocarbon reactives, ethylenically unsaturated aromatic hydrocarbons and, optionally, non-reactive hydrocarbons wherein none, a part, or all of the ethylenically unsaturated aromatic hydrocarbons are polymerized. The prehydrolysis reaction product is a mixture of polycarboxylic acid esters of the esterifiable hydrocarbon reactives containing unesterified acid, non-reactive hydrocarbons, if any are present, and polymerization products of the ethylenically unsaturated aromatic hydrocarbons. The term polymerization, as is used herein, is meant to encompass dimers, oligomers, copolymers, and homopolymers. This reaction may conveniently be performed in stages whereby reactants are added stepwise thus controlling reaction exotherms.

It is most preferred that a stoichiometric excess of water be used if the mixture containing esterifiable hydrocarbon reactives, ethylenically unsaturated aromatic hydrocarbons and, optionally, non-reactive hydrocarbons contains substantial amounts (about 2 percent by weight or more) unpolymerized (i.e. monomeric) ethylenically unsaturated aromatic hydrocarbons. A stoichiometric excess of at least about 10 mole percent and preferably 50 to 100 mole percent or more based on moles of polycarboxylic anhydride reactant is most preferred. The use of less than stoichiometric amounts of water can favor the presence of non-hydrolyzed polycarboxylic anhydride at the reaction temperatures typically employed. This polycarboxylic anhydride can enter into copolymerization reaction with the ethylenically unsaturated aromatic hydrocarbons thus producing a polymeric anhydride. The net result of this copolymerization can be eventual gelation of the reactor as well as substantial reduction in $\alpha,\beta$-unsaturated groups as provided by the polycarboxylic acid and used for later crosslinking reaction. The latter result can lead to a resin of poor curability and reactivity.

When a non-reactive hydrocarbon component is present, such as, for example, if a resin oil is used, a substantial amount of the non-reactive hydrocarbon component and water may azeotropically distill out of the reaction mixture. This material is preferably recycled back into the reactor during the prehydrolysis or contained in the reactor either under reflux or moderate pressure as is required to maintain the proper water stoichiometry.

In a typical procedure, molten maleic anhydride and a 75 mole percent excess of water are maintained at an elevated temperature of from about 100° to 150° C. The temperature is allowed to stabilize at about 100° to 110° C. then a mixture of dicyclopentadiene (80 pbw) and styrene (20pbw) is added at a rate which maintains a reaction temperature between about 100° to 130° C. The amount of maleic (or other) anhydride employed in this prehydrolysis step may be equal to the equivalent of dicyclopentadiene in which event the product is essentially monoester (dicyclopentadienyl monomaleate) containing lesser amounts of diester [bis(dicyclopentadienyl maleate)], dicyclopentadienyl monoalcohol, maleic anhydride, maleic acid, polystyrene and the like. Alternatively, the amount of anhydride may be the equivalent needed to make the monoester plus that excess that is to be used in the subsequent esterification (or esteramidation) step. It is notable that reductions in the water stoichiometry (either in the initial charge or reductions incurred via distillative stripping during the reaction) favor retention of maleic anhydride and thus formation of styrene-maleic anhydride copolymer, a polyanhydride.

To the mixture of polycarboxylic acid esters of the esterifiable hydrocarbon reactives containing unesterified acid, non-reactive hydrocarbons, if any are present, and polymerization products of the ethylenically unsaturated aromatic hydrocarbon is added the polyol (B) and a polyamine, if used. When a polyamine is used, that addition can be a bulk addition wherein all of the polyol and polyamine are added in one step. Alternately the addition can be an incremental addition wherein all of the polyol and a fractional equivalent of the polyamine are added initially and allowed to react after which subsequent increments of polyamine are added. In all instances, water is continuously removed during the esterification (esteramidation step). The timing of the remaining polyamine additions can be easily determined by the amount of water removed, by acid number or by viscosity. Incremental polyamine addition aids in the control of reaction exotherm when some polyamines are used.

After addition of polyol and, optionally, polyamine, is complete, the reaction can be driven to maximum yield by maintaining or increasing the temperature until the desired acid number has been achieved. Typically, acid numbers of 15 to 40 are preferred, with 20 to 35 most preferred. Acid numbers that are somewhat higher or lower may be tolerated and, in some instances, may be desired for certain applications.

The "hydrolysis" method wherein molten polycarboxylic anhydride, is partially hydrolyzed with less than the stoichiometric equivalent of water and reacted with the mixture containing esterifiable hydrocarbon reactives, ethylenically unsaturated aromatic hydrocarbons and, optionally, non-reactive hydrocarbons is only satisfactory for use with the aforesaid mixtures wherein all or a substantial part of the ethylenically unsaturated aromatic hydrocarbons have been polymerized. Generally less than about 5 pbw unreacted (monomeric) ethylenically unsaturated aromatic hydrocarbons should be present in the mixture if the hydrolysis method is employed.

In a typical procedure, molten maleic anhydride and a fraction of the stoichiometric equivalent of water are maintained at an elevated temperature of from about 60° C. to 130° C. The initial fractional equivalent of dicyclopentadiene containing 18 pbw of styrene polymerization products and 2 pbw or less styrene (prepared by free radical polymerization in situ of 20 pbw styrene in 80 pbw dicyclopentadiene) is added then allowed to react. A second fractional equivalent of water and of dicyclopentadiene containing styrene polymerization products is added and allowed to react. Additional fractional equivalents are added and each allowed to react before subsequent addition of the next increment until the desired amount of reactants have been added.

The polyol and polyamine, if used, are added to the hydrolysis reaction product and reacted as described in the aforementioned prehydrolysis method.

When a mixture containing a non-reactive hydrocarbon component such as, for example, a resin oil, is used, a substantial amount of the non-reactive hydrocarbon component is removed along with the water from the reaction. Lesser amounts of non-reactive hydrocarbon component can be left in the unsaturated polyester or polyesteramide to serve as a plasticizer which flexibilizes the unsaturated polyester or polyesteramide thus resulting in improved mechanical properties.

The products of the present invention are designated as polymer modified unsaturated polyesters and polyesteramides due to the presence of a dispersed polymer component derived from in situ polymerization of the ethylenically unsaturated aromatic hydrocarbon portion of the reactants used. In other words, the result of the polymerization of the unsaturated aromatic hydrocarbons is a hydrocarbon polymer modified unsaturated polyester or polyesteramide resin.

As is common in the unsaturated polyester and polyesteramide art, the polymer modified unsaturated polyesters (polyesteramides) of this invention may be blended with a monomer that is compatible therewith. Typical of the vinyl monomers are the alkenyl aromatics, such as styrene, vinyltoluenes or chlorostyrenes. Acrylic monomers, although less preferred, may also be used separately or in conjunction with the vinyl aromatic monomer. Typical of the acrylic monomers is methylmethacrylate. Other useful vinyl monomers will be well known to the skilled artisan. The vinyl monomer, frequently called a reactive diluent, may be employed within a wide range of concentration of from about 20 to 80 percent of diluent to 80 to 20 percent of resin. The optimum amount will depend in large measure on the unsaturated polyester (polyesteramide), the diluent, and the properties desired in the cured and uncured states. Reactive diluents are employed principally to adjust the viscosity of the resin blend to permit its facile use in the polymer concrete formulation.

Polymer concrete is a composition made by blending of a curable resin component and an aggregate component. The polymer concrete composition of the present invention is prepared by blending from about 2 percent to about 20 percent by weight of the polymer modified unsaturated polyester or polyesteramide resin with from about 98 to about 80 percent by weight of an aggregate component.

The aggregate component is typically sand, gravel, crushed stone or rock, silica flour, fly ash, and the like or mixtures thereof. Up to about 50 percent by weight of metal fines, glass fibers, synthetic fibers, glass reinforcing mats, glass strands, glass filaments, metal turnings, metal fibers, mineral powders and the like or mixtures thereof may be present in the aggregate composition. The exact components used in the aggregate composition are generally dictated by the physical properties required of the cured polymer concrete composition. Thus, optimal aggregate particle size distribution can be determined by simple preliminary experiments. Preparation of typical aggregates is described in ASTM C 33-82, ASTM D 448-80 and AASMO Designation M 6-65.

The polymer concrete compositions of the present invention are curable by known catalyst systems including the previously described free-radical forming catalysts. Peroxides, such as methylethylketone peroxide, can be used with or without known promoters, such as cobalt octoate or cobalt naphthenate, that function with such peroxides. Acyl peroxides, such as benzoyl peroxides, can be used with or without promoters, such as tertiary amines, typically including N,N-dimethyl aniline and N,N-dimethyl-p-toluidine. The concentrations of catalyst and promoter are adjusted within known limits of about 0.05 to 5.0 weight percent depending on the rate of cure desired, the magnitude of the generated exotherm and for other known purposes. Known gelation retarding agents, such as p-benzoquinone, can be employed in the curing system.

Other additives that are conventional to the polymer concrete art may also be included in the formulations based upon the polymer modified unsaturated polyester or polyesteramide resin and aggregate compositions of the present invention. Thus pigments and other colorants; polymeric shrinkage control agents such as, for example, polystyrene, saturated polyester, polyvinyl acetate and the like, waxes, mold release agents and other resins, polymers and additives may be added to serve their intended function.

The polyester concretes of the present invention benefit from the low shrinkage on curing inherent to the polymer modified unsaturated polyester or polyesteramide component. Because of their high mechanical strength and excellent compressive bond strength to both wet and and dry concrete surfaces, the polymer concretes of the present invention are especially well suited for use in repair of spalled, cracked or otherwise damaged concrete surfaces; for fabrication of precast parts such as machine bases and for lining of pipe and trenches.

The following examples are given to illustrate the invention and not to limit the scope of the invention. All parts and percentages are by weight unless otherwise specified.

EXAMPLE 1

A. Preparation of Polymer Modified Unsaturated Polyesteramide Resin

Maleic anhydride (5.00 moles, 490.3 g) was added to a reactor and heated to 100° C. under a nitrogen atmosphere with stirring. Water (5.50 moles, 99.11 g) was added and induced a maximum exotherm of 135° C. two minutes later. Cooling reduced the reactor temperature to 125° C. after an additional 5 minutes. Fifteen minutes after the initial water addition, a commercial grade (Dow Chemical Co.) of resin oil designated as RO-60 (326.57 g) was added to the reactor. Capillary gas chromatographic-mass spectroscopic analysis of the RO-60 demonstrated the following composition: 63.41 weight percent esterifiable hydrocarbon reactives composed of cyclopentadiene (5.02 percent), butadiene/cyclopentadiene codimers (3.74 percent), dicyclopentadiene (50.51 percent), indene (3.25 percent), and methylcyclopentadiene/cyclopentadiene codimer (5.91 percent); 12.92 weight percent ethylenically unsaturated aromatic hydrocarbon reactives composed of styrene (11.48 percent) and vinyl toluene (1.44 percent); and 23.67 weight percent nonreactive hydrocarbons composed of ethylbenzenes (0.13 percent), xylenes (1.52 percent) naphthalene (0.18 percent), trimethylbenzenes, di- and trimethylbenzenes, methylethyl benzenes, and the like. A maximum exotherm of 139° C. occurred 3 minutes later. Cooling reduced the reactor temperature to 125° C. A second portion of RO-60 (326.57 g) was added 15 minutes after the initial RO-60 addition. A final portion of RO-60 (326.57 g) was added 15 minutes later and the 125° C. reaction temperature was reachieved 4 minutes later. Thirty minutes after the addition of the final portion of RO-60, ethylene glycol (2.70 moles, 167.56 g) and piperazine (0.30 mole, 25.84 g) were added to the reactor, the steam condenser was started, nitrogen sparging was increased to 0.75 liter per minute and the temperature controller was set at 160° C. The 160° C. temperature was achieved 22 minutes later. After 2 hours at 160° C., the temperature controller was set at 205° C. and this temperature was achieved 26 minutes later. After 10 hours, a total of 100 ml of water layer and 169 ml of organic material were collected in the Dean Stark trap. The reactor was cooled to 165° C. and 100 ppm of hydroquinone was added. The modified unsaturated polyesteramide was recovered as a transparent, light yellow-colored solid with a final acid number of 18.5.

B. Preparation of Polymer Concrete and Evaluation of Compressive Bond Strength Compressive strength test pieces were prepared using a modification of standard method (ASTM C-882) wherein a polymer concrete formulation was poured onto a concrete cylinder with a 30° angle face. Each concrete cylinder was contained in a plastic cylindrical mold. A portion (171 g) of the polymer modified unsaturated polyesteramide of Example 1A was blended with styrene (129 g) to provide a 43 percent styrenated solution. A portion (277 g) of the styrenated resin solution was catalyzed using 0.30 percent by weight dimethylaniline and 1.00 percent by weight benzoyl peroxide, then 1108 g of a 50/50 volume percent mixture of number 3 and number 4 blasting sand was stirred into the solution. The resulting polymer concrete was split to two equivalent portions which were used to prepare duplicate compressive strength test pieces. A tamping rod and vibrator were used to pack the cylindrical molds with the polymer concrete and assist in removal of bubbles before gelation. After post-curing for three days at room temperature (25° C.), the 3-inch by 6-inch cylindrical compressive strength test pieces were demolded and tested by loading along their longitudinal axes at a loading rate of 18,000 psi per minute until failure occurred. The ultimate load was divided by the cross-sectional area to determine the compressive strength of each sample. The average of the duplicate compressive strength values is given in Table I and designated as dry.

EXAMPLE 2

The method of Example 1-B, was repeated except that each concrete cylinder contained in a plastic cylindrical mold was immersed under water for 3 hours. The water was then poured off each cylinder 5 minutes prior to adding the polymer concrete. The average of the duplicate compressive strength values is given in Table I and designated as wet.

TABLE I

| | Compressive Strength (psi) |
|---|---|
| Example 1 | |
| Dry | 5315 |
| [KPa × 10$^3$] | [36.646] |
| Example 2 | |
| Wet | 3045 |
| [KPa × 10$^3$] | [20.995] |

COMPARATIVE EXAMPLE 1

A. Dicyclopentadiene Modified Unsaturated Polyester

Maleic anhydride (686.42 g, 7.00 moles) was added to a reactor and heated to a clear, stirred solution maintained at 100° C. under a nitrogen atmosphere. Water (127.94 g, 7.10 moles) was added inducing a maximum exotherm of 134° C. two minutes later. The reactor was air-cooled to 121° C. and 15 minutes after the initial water addition, dicyclopentadiene (277.64 g, 2.10 moles) was added. A maximum exotherm of 125° C. resulted 2 minutes later and after an additional 3 minutes, air cooling reduced the reaction temperature to 120° C. Fifteen minutes after the initial dicyclopentadiene addition, a second portion of dicyclopentadiene (277.64 g, 2.10 moles) was added. A maximum exotherm of 129° C. resulted 3 minutes later and after an additional 3 minutes, air cooling reduced the reaction temperature to 120° C. A final portion of dicyclopentadiene (277.64 g, 2.10 moles) was added 15 minutes after the second dicyclopentadiene addition and the 120° C. reaction temperature was re-achieved 3 minutes later. Thirty minutes later, propylene glycol (319.62 g, 4.20 moles) was added, nitrogen sparging was increased to 0.75 liter per minute, the steam condenser was started, and the temperature controller was set at 160° C. This temperature was achieved 34 minutes later. After 2 hours, the temperature controller was set at 205° C. and this temperature was achieved 29 minutes later. After 14 hours, 156 milliliters of water layer and 18 milliliters of organic material were recovered into the Dean Stark trap. The reactor was cooled to 165° C. and 100 ppm of hydroquinone were added. The dicyclopentadiene modified unsaturated polyester was recovered as a transparent, light-yellow colored solid with a final acid number of 19.6.

B. Preparation of Polymer Concrete and Evaluation of Compressive Bond Strength The methods of Examples 1-B and 2 were repeated using polymer concrete prepared from a 43 percent sytrenated solution of the dicyclopentadiene modified unsaturated polyester. The average of the compressive strength values is given in Table II and designated as dry or wet, respectively.

TABLE II

| Comparative Example 1 | Compressive Strength (psi) |
|---|---|
| Dry | 3040 |
| [KPa × 10³] | [20.96] |
| Wet | 2155 |
| [KPa × 10³] | [14.858] |

COMPARATIVE EXAMPLE 2

A. Dicyclopentadiene Modified Unsaturated Polyesteramide

A dicyclopentadiene modified unsaturated polyesteramide was prepared using the method of Comparative Example 1 except that the propylene glycol (319.62 g, 4.20 moles) was replaced with propylene glycol (287.66 g, 3.78 moles) plus piperazine (36.18 g, 0.420 mole). The dicyclopentadiene modified unsaturated polyesteramide was recovered as a transparent light-yellow solid with a final acid number 18.9.

B. Preparation of Polymer Concrete and Evaluation of Compressive Bond Strength The methods of Examples 1-B and 2 were repeated using polymer concrete prepared from a 43 percent styrenated solution of the dicyclopentadiene modified unsaturated polyesteramide. The average of the compressive strength values is given in Table III and designated as dry or wet, respectively.

TABLE III

| Comparative Example 2 | Compressive Strength (psi) |
|---|---|
| Dry | 4290 |
| [KPa × 10³] | [29.579] |
| Wet | 2160 |
| [KPa × 10³] | [14.893] |

COMPARATIVE EXAMPLE 3

A. Orthophthalic Unsaturated Polyester

Maleic anhydride (411.85 g, 4.20 moles) was phthalic anhydride (414.71 g, 2.80 moles) were added to a reactor and heated to a white-colored stirred slurry maintained at 100° C. under a nitrogen atmosphere. Propylene glycol (585.97 g, 7.70 moles) was added and a maximum exotherm of 153° C. resulted 17 minutes later. At that time, nitrogen sparging was increased to 0.75 liter per minute, the steam condenser was started, and the temperature controller was set at 160° C. That temperature was achieved 5 minutes later. After 2 hours at 160° C. reactive temperature, the temperature controller was set at 205° C. and that temperature was achieved 58 minutes later. After 10.0 hours at the 205° C. reaction temperature, a total of 128 milliliters of water layer was recovered into the Dean Stark trap. The reactor was cooled to 160° C. and 100 ppm of hydroquinone was added. The unsaturated polyester was recovered as a clear, transparent solid with a final acid number of 26.4.

B. Preparation of Polymer Concrete and Evaluation of Compressive Bond Strength The methods of Examples 1-B and 2 were repeated using polymer concrete prepared from a 43 percent styrenated solution of the orthophthalic unsaturated polyester. The average of the compressive strength values is given in Table IV and designated as dry or wet, respectively.

TABLE IV

| Comparative Example 3 | Compressive Strength (psi) |
|---|---|
| Dry | 3900 |
| [KPa × 10³] | [26.89] |
| Wet | 1625 |
| [KPa × 10³] | [11.204] |

EXAMPLE 3

Tensile strength test pieces were prepared using a standard method (ASTM C-307). A portion (85.5 g) of the polymer modified unsaturated polyesteramide of Example 1, the dicyclopentadiene modified unsaturated polyester of Comparative Example 1, the dicyclopentadiene modified unsaturated polyesteramide of Comparative Example 2, and the orthophthalic unsaturated polyester of Comparative Example 3, respectively, were blended with styrene (64.5 g) to provide 43 percent styrenated solutions. A portion (100 g) of each respective resin solution was catalyzed using 0.30 percent by weight dimethylaniline and 1.00 percent by weight benzoyl peroxide, then 400 g of a 50/50 volume percent mixture of number 3 and number 4 blasting sand was stirred into the solution. The resulting polymer concrete was split into two equivalent portions which were used to prepare duplicate tensile strength test pieces. A tamping rod was used to pack brass two-piece molds which had been coated with a wax release agent. After post-curing for 3 days at room temperature (25° C.), the test pieces were demolded and tested on an Instron machine at a crosshead speed of 0.2 inch per minute until failure occurred. The average of the duplicate tensile strength values is given in Table V.

TABLE V

|  | Tensile Strength (psi) [KPa × 10³] |
| --- | --- |
| Example 1 | 1573 [10.846] |
| Comp. Ex. 1 (1) | 1220 [8.412] |
| Comp. Ex. 2 (1) | 1150 [7.929] |
| Comp. Ex. 3 (1) | 1390 [9.584] |

(1) Not an embodiment of the invention.

I claim:

1. A curable polymer concrete composition comprising
   (A) about 2 to about 20 percent by weight of a polymer modified unsaturated polyester or polyesteramide resin, and
   (B) about 98 to about 80 percent by weight of an aggregate
   wherein said resin is the reaction product of
   (C) one or more alpha, beta ethylenically unsaturated polycarboxylic acids, anhydrides, or mixtures thereof with or without one or more saturated or aromatic polycarboxylic acids or anhydrides thereof
   (D) about 1.1 to about 2.0 moles of water per mole of unsaturated polycarboxylic acid or anhydride,
   (E) one or more polyols or a mixture of one or more polyols and polyamines and
   (F) a hydrocarbon mixture comprising
      (1) esterifiable hydrocarbons,
      (2) 5 to 50 percent by weight of ethylenically unsaturated aromatic hydrocarbons with or without polymerized derivatives thereof and
      (3) non-reactive hydrocarbons.

2. The composition of claim 1 wherein said aggregate composition comprises sand, gravel, crushed stone or rock, silica flour, fly ash or mixtures thereof.

3. The composition of claim 2 wherein the aggregate composition additionally contains up to about 50 percent by weight of metal fines, glass fibers, synthetic fibers, glass reinforcing mats, glass strands, glass filaments, metal turnings, metal fibers, mineral powders or mixtures thereof.

4. The cured composition of claim 1.

5. The cured composition of claim 2.

6. The cured composition of claim 3.

7. A curable polymer concrete composition comprising
   (A) about 8 to about 15 percent by weight of a hydrocarbon polymer modified polyesteramide resin and
   (B) about 92 to about 85 percent by weight of an aggregate
   wherein said resin is the reaction product of
   (C) one or more alpha, beta ethylenically unsaturated polycarboxylic acids, anhydrides, or mixtures thereof with or without one or more saturated or aromatic polycarboxylic acids or anhydrides thereof
   (D) about 1.1 to about 2.0 moles of water per mole of unsaturated polycarboxylic acid or anhydride,
   (E) a mixture of one or more polyols and polyamines and
   (F) a hydrocarbon mixture comprising
      (1) esterifiable hydrocarbons,
      (2) 5 to 50 percent by weight of ethylenically unsaturated aromatic hydrocarbons with or without polymerized derivatives thereof and
      (3) non-reactive hydrocarbons.

8. The composition of claim 7 wherein said aggregate composition comprises sand, gravel, crushed stone or rock, silica flour, fly ash or mixtures thereof.

9. The composition of claim 8 wherein the aggregate composition additionally contains up to abut percent by weight of metal fines, glass fibers, synthetic fibers, glass reinforcing mats, glass strands, glass filaments, metal turnings, metal fibers, mineral powders or mixtures thereof.

10. The cured composition of claim 7.

11. The cured composition of claim 8.

12. The cured composition of claim 9.